US012154534B2

(12) United States Patent
Groeber

(10) Patent No.: US 12,154,534 B2
(45) Date of Patent: Nov. 26, 2024

(54) HARMONIOUS AUDIO GENERATION

(71) Applicant: Gary Groeber, Virginia Beach, VA (US)

(72) Inventor: Gary Groeber, Virginia Beach, VA (US)

( * ) Notice: Subject to any disclaimer, the term of this patent is extended or adjusted under 35 U.S.C. 154(b) by 0 days.

(21) Appl. No.: 18/403,680

(22) Filed: Jan. 3, 2024

(65) Prior Publication Data

US 2024/0249709 A1 Jul. 25, 2024

Related U.S. Application Data

(60) Provisional application No. 63/481,055, filed on Jan. 23, 2023.

(51) Int. Cl.
*G10H 1/18* (2006.01)
*G10H 1/00* (2006.01)
*G10H 1/34* (2006.01)

(52) U.S. Cl.
CPC ........... *G10H 1/182* (2013.01); *G10H 1/0008* (2013.01); *G10H 1/34* (2013.01); *G10H 2220/221* (2013.01)

(58) Field of Classification Search
CPC ........ G10H 1/182; G10H 1/0008; G10H 1/34; G10H 2220/221
See application file for complete search history.

(56) References Cited

U.S. PATENT DOCUMENTS 4,402,245 A * 9/1983 Oya ........................ G10H 1/187 984/336
2018/0040314 A1* 2/2018 Laughlin .............. G10H 1/0066

* cited by examiner

*Primary Examiner* — Jianchun Qin
(74) *Attorney, Agent, or Firm* — Kilpatrick Townsend & Stockton LLP

(57) ABSTRACT

Techniques are disclosed herein for generating harmonious audio. An input for changing a mode of an electronic device from a first mode to a second mode can be received and, in response, a controller of the electronic device can modify electrical connections between a matrix circuit and a set of keys of the electronic device. In modifying the electrical connections, a set of tones associated with a first subset of keys of the set of keys can be associated with a second subset of keys of the set of keys. Keys of the second subset of keys can be adjacent to at least one other key of the second subset of keys and tones of the set of tones can be associated with respective keys of the second subset of keys. Audio output when one key is operated can be harmonious with audio output when other keys are operated.

20 Claims, 6 Drawing Sheets

HARMONIOUS AUDIO GENERATION

CROSS-REFERENCE TO RELATED APPLICATIONS

The present application is a Non-Provisional Application and claims the benefit of and priority to U.S. Provisional Application No. 63/481,055 having a filing date of Jan. 23, 2023, the entire contents of which are incorporated herein by reference for all purposes.

BACKGROUND

Electronic devices equipped with audio generation functionality have become prevalent. Such electronic devices often include switches, buttons, keyboards, interfaces, etc., that facilitate audio generation in response to human interaction with these electronic devices. In some cases, input received by an electronic device from a user interacting with the electronic device causes the electronic device to generate and output sounds. In some cases, the electronic device can function as a musical instrument in which the sounds that are generated and output have different musical tones and/or correspond to different musical scales. Users of such electronic devices may not be familiar with musical notes or scales. Therefore, it may be desirable to provide an electronic device with harmonious audio generation functionality.

SUMMARY

Embodiments described herein pertain to electronic devices and, more particularly, electronic devices for generating and outputting harmonious audio.

In various embodiments, a method for controlling an electronic device includes detecting that an input for changing a mode of the electronic device from a first mode to a second mode has been received; and, in response to detecting that the input for changing the mode of the electronic device from the first mode to the second mode has been received, causing a controller to modify electrical connections between a matrix circuit and a set of keys of the electronic device, wherein modifying the electrical connections between the matrix circuit and the set of keys causes a set of tones associated with a first subset of keys of the set of keys to be associated with a second subset of keys of the set of keys, wherein each key of the second subset of keys is adjacent to at least one other key of the second subset of keys, and wherein each tone of the set of tones is associated with a respective key of the second subset of keys.

In some embodiments, causing the controller to modify the electrical connections between the matrix circuit and the set of keys comprises modifying an electrical connection between the matrix circuit and the first subset of keys and modifying an electrical connection between the matrix circuit and the second subset of keys.

In some embodiments, at least one key of the first subset of keys is included in the second subset of keys.

In some embodiments, a sound output by the electronic device when the at least one key is pressed while the electronic device is in the first mode is different from a sound output by the electronic device when the at least one key is pressed while the electronic device is in the second mode.

In some embodiments, at least one key of the first subset of keys is adjacent to at least one key of a third subset of keys of the plurality of keys.

In some embodiments, modifying the electrical connections between the matrix circuit and the set of keys causes at least one tone associated with a key in the third subset of keys to be associated with a key in the second subset of keys.

In some embodiments, the set of tones is included in a musical scale.

Some embodiments include an electronic device that includes a set of keys, one or more processors, and a computer-readable medium that stores instructions which, when executed by the one or more processors, cause the electronic device to perform part or all of the operations and/or methods disclosed herein.

Some embodiments include a non-transitory computer-readable medium storing instructions which, when executed by one or more processors, cause an electronic device to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
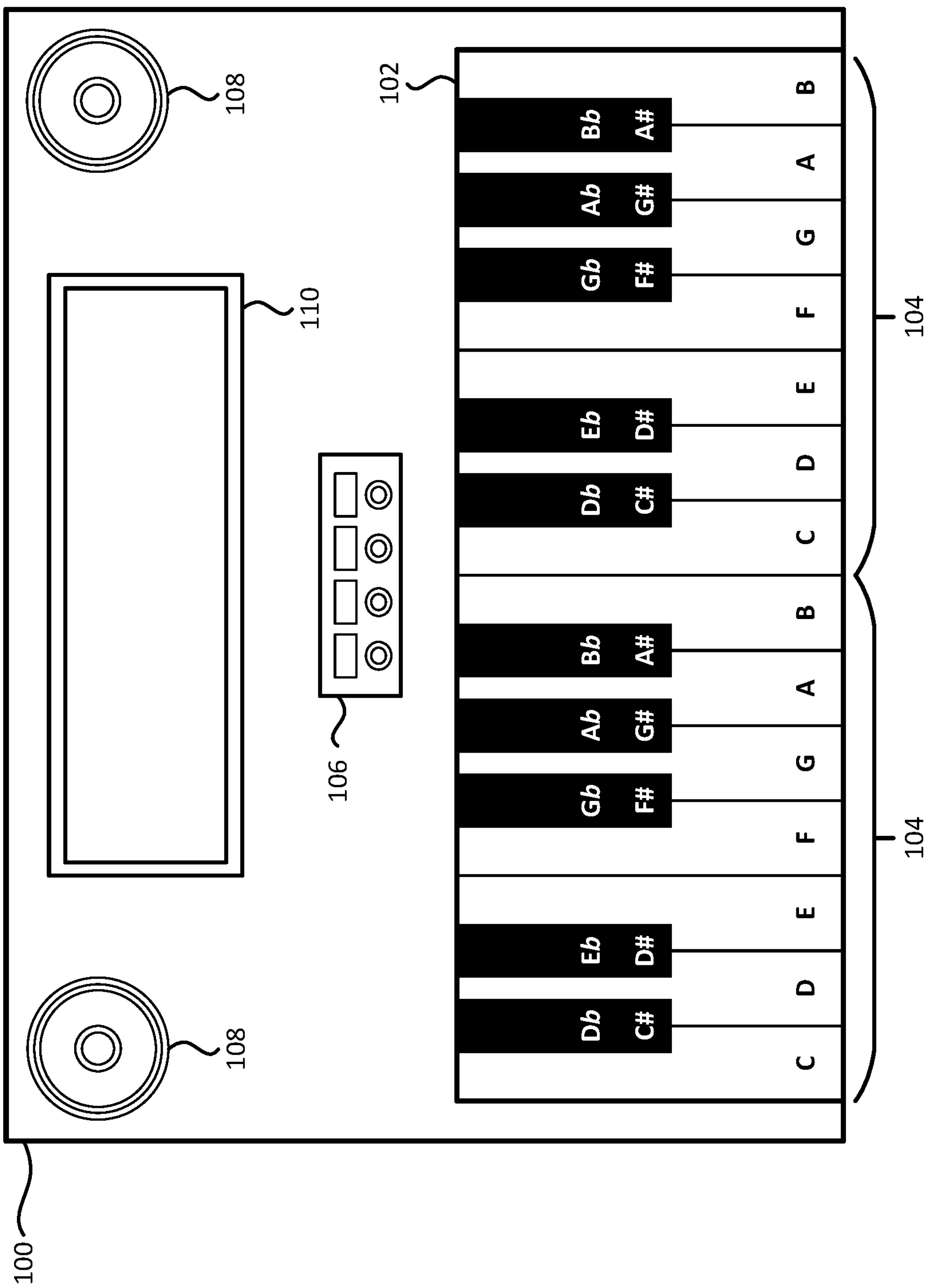
FIG. 1 illustrates an example of an electronic device according to some implementations of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Electronic devices equipped with audio generation functionality are often used to produce audio such as music. That is, users can use these electronic devices to generate and output audio having different musical tones and corresponding to different musical scales. Typically, to facilitate such music production, these electronic devices include various input mechanisms such as a keyboard, buttons, switches, interfaces, and the like that cause the electronic device to generate and/or output sounds when operated. Various portions of these input mechanisms can be associated with musical notes and can be operated to cause these electronic devices to generate and/or output audio having musical tones corresponding to the musical notes. For example, in the case of an electronic device including a piano-type keyboard that has a series of white keys and black keys, a user can operate (e.g., press) one key of the keyboard (e.g., a white key) that is associated with one musical note to cause the electronic device to generate and output a musical tone associated with that musical note and can also operate another key of the keyboard (e.g., a black key) that is associated with another musical note to cause the electronic device to generate and output a musical tone associated with that other musical note. By continuously and, in some cases, concurrently, operating different portions of these input mechanisms (e.g., different keys on a keyboard), music can be produced.

A piano-type keyboard is typically comprised of a linear arrangement of a set of keys. The set of keys can include one subset of keys (e.g., the white keys) that are interposed with another subset of keys (e.g., the black keys) that are also linearly arranged. The set of keys are typically associated with octaves such that, for each octave, keys of the one subset of keys and keys of the other subset of keys can correspond to different musical notes (or tones) of the respective octave. Each octave of the octaves can include the same set of tones and each tone of a respective octave can be associated with a different key of the set of keys. For example, in the case of an octave that includes 12 tones such as C, C #, D, D #, E, F, F #, G, G #, A, A #, B, seven keys of the one set of keys can correspond to the musical tones C, D, E, F, G, A, and B of the respective octave and five keys of the other set of keys can correspond to the musical tones C #, D #, F #, G #, and A # of the respective octave. Musical tones within each octave can form one or more musical scales. For example, in the case of a 12 tone octave, a group of five musical tones of those 12 tones can form a musical scale (e.g., a major pentatonic musical scale). In another example, a group of seven musical tones of those 12 tones can form another musical scale (e.g., a minor heptatonic musical scale).

Users that use these electronic devices to produce music typically understand musical compositions and, in many cases, have been trained to play musical instruments such as pianos and guitars. As such, those users can often read music, understand musical scales, and operate the keys in such a way that the tones that are generated and output by these electronic devices are harmonious with one another. However, users of these electronic devices that are unfamiliar with musical composition and/or do not know how to read music and/or play a musical instrument, may have difficulty using and enjoying these electronic devices. For example, such users may want to use the electronic device to play a song and may have access to the sheet music for the song, but do not know which keys to operate so that the audio that is generated and output by the electronic device corresponds with the notes and the scale of the song. In many cases, such users will operate keys that are associated with tones that are not harmonious with one another. As a result, these users often experience frustration and may avoid using such electronic devices altogether. Still, some users of these electronic devices may not have knowledge of music production, musical notes, and/or musical scales and may be apprehensive of using these electronic devices.

The features and techniques described herein overcome these challenges and/or others by providing an electronic device for generating harmonious audio and a method for controlling the electronic device to generate harmonious audio. Using the techniques described, the electronic device can be used by novice and experienced users to generate and output audio corresponding to tones that are harmonious with one another.

In some implementations, an electronic device can include a set of keys and a method for controlling the electronic device can include detecting that an input for changing a mode of the electronic device from a first mode to a second mode has been received, and, in response to detecting that such an input has been received, a controller can modify electrical connections between a matrix circuit of the electronic device and the set of keys. Modifying the electrical connections between the matrix circuit and the set of keys can cause a set of tones associated with a first subset of keys of the set of keys to be associated with a second subset of keys of the set of keys.

In some implementations, modifying the electrical connections between the matrix circuit and the set of keys can include modifying an electrical connection between the matrix circuit and the first subset of keys and modifying an electrical connection between the matrix circuit and the second subset of keys. Each key of the second subset of keys can be adjacent to at least one other key of the second subset of keys and each tone of the set of tones can be associated with a respective key of the second subset of keys. In some implementations, at least one key of the first subset of keys is included in the second subset of keys, and a sound output by the electronic device when the at least one key is pressed while the electronic device is in the first mode is different from a sound output by the electronic device when the at least one key is pressed while the electronic device is in the second mode. In some implementations, at least one key of the first subset of keys is adjacent to at least one key of a third subset of keys of the plurality of keys, where modifying the electrical connections between the matrix circuit and the set of keys causes at least one tone associated with a key in the third subset of keys to be associated with a key in the second subset of keys. In some implementations, the set of tones is included in a musical scale.

FIG. 1 illustrates an example of an electronic device 100. In some implementations, the electronic device 100 can be an electronic instrument such as an electronic piano or keyboard. In other implementations, the electronic device 100 can be a personal computer, a smartphone, a video game console, an audio synthesizer, a musical instrument digital interface (MIDI) controller, a drum machine, an electric drum kit, a music workstation, an audio sampling workstation, an audio effects unit, an audio amplifier, an audio mixing console, and the like. These examples are not meant to be limiting and other examples are also possible.

The electronic device 100 includes, but is not limited to, a set of keys 102, control panel 106, speakers 108, and a display device 110. The set of keys 102 includes a linear arrangement of a group of color-coded keys (e.g., the white keys) that are interposed with a linear arrangement of another group of color-coded keys (e.g., the black keys). The set of keys 102 can include any number of keys (e.g., 32, 36, 37, 49, 54, 61, 76, 88, etc.). The number of keys within each group of color-coded keys can be based on the total number of keys included in the set of keys 102. For example, in the case the set of keys 102 includes 88 keys, one group of color-coded keys can include 52 keys (e.g., 52 white keys) and the other group of color-coded keys can include 36 keys (e.g., 36 black keys). In another example, in the case the set of keys 102 includes 54 keys, one group of color-coded keys can include 32 keys (e.g., 32 white keys) and the other group of color-coded keys can include 22 keys (e.g., 22 black keys).

The keys in the set of keys 102 can be configured to be operated by a user. In some implementations, the keys can be operated by touching and/or depressing. For example, a user wishing to operate a key in the set of keys 102 can touch the surface of the key. In another example, a user wishing to operate a key in the set of keys 102 can depress the key. The keys in the set of keys 102 can be configured to cause the electronic device 100 to generate and output audio when operated. In some implementations, each key in the set of keys 102 can be electrically connected to a matrix circuit included in the electronic device 100. In some implementations, when a key in the set of keys 102 is operated, the matrix circuit can be configured to generate a signal associated with the key and route that signal to one or more other components of the electronic device 100 for generating audio associated with the key. For example, when a key in the set of keys 102 is operated, the matrix circuit can be configured to generate a signal associated with that key and route that signal to a processor where it can be processed into audio corresponding to the key and that can be output. In some implementations, the audio can be output using speakers 108.

In some implementations, each key in the set of keys 102 can, when operated, cause the electronic device 100 to generate and output audio having a different tone, note, or pitch from the tone, note, or pitch of the audio generated and output by the electronic device 100 when another key in the set of keys 102 is operated. For example, a user can operate (e.g., depress) a white key of the set of keys 102 to cause the electronic device 100 to generate and output audio having a first tone and can operate a black key of the set of keys 102 to cause the electronic device 100 to generate and output audio having a second tone that is different from the first tone. By continuously and, in some cases, concurrently, operating different keys of the set of keys 102, audio can be continuously generated and output by the electronic device 100.

In some implementations, the audio generated and output by the electronic device 100 can be in the form of music and/or musical. In some implementations, the keys in the set of keys 102 can be associated with octaves 104 such that, for each octave 104, keys in one group of color-coded keys (e.g., the white keys) and keys of the other group of color-coded keys (e.g., the black keys) can correspond to different musical tones of the respective octave 104. Each octave 104 of the octaves 104 can include the same set of tones and each tone of a respective octave 104 can be associated with a different key of the set of keys 102. For example, as shown in FIG. 1, an octave 104 can include 12 tones with seven white keys corresponding to the tones C, D, E, F, G, A, B of the 12 tones and five black keys corresponding to the tones C #/Db, D #/Eb, F #/Gb, G #/Ab, A #/Bb of the 12 tones. Musical tones that form each octave 104 can form one or more musical scales for the respective octave 104. For example, for octave 104, a group of five tones (e.g., C, D, E, G, A) can form a musical scale (e.g., a C Major Pentatonic musical scale). In another example, a group of seven tones (e.g., C #, D #, E, F #, G #, A, and B) of those 12 tones can form another musical scale (e.g., a C Sharp Minor Heptatonic musical scale).

In some implementations, musical tones in a musical scale are harmonic such that audio corresponding to a musical tone included in musical tones in a musical scale that is generated and output by the electronic device 100 is harmonious with audio corresponding to any other musical tone in the musical scale that is generated and output by the electronic device 100. For example, for the C Major Pentatonic scale for a respective octave 104, the tones C, D, E, G, A of that scale are harmonic, and the audio generated and output by the electronic device 100 corresponding to those tones is harmonious. In some implementations, a tone in the musical tones of a respective octave 104 can serve as a root tone or starting tone of a musical scale. For example, for the C Major Pentatonic scale in a respective octave 104, the tone C can serve as a root/starting tone for the scale. As such, to generate and output audio corresponding to the root/staring tone in the C Major Pentatonic scale, a user can operate the key in the set of keys 102 corresponding to the tone C in a respective octave 104.

The foregoing features have described with respect to a set of keys 102, but this is not intended to be limiting and other mechanisms can be included in the electronic device 100 that cause the electronic device 100 to generate and output audio corresponding to musical tones when operated. Examples of other mechanisms include physical and soft buttons, switches, keys, knobs, pads, and the like.

As described above, a user of the electronic device 100 may be unfamiliar with musical composition, may not know how to read music, and/or may not know how to play a musical instrument. As such, a user intending to operate a key in the set of keys 102 corresponding one musical tone in one musical scale may operate a key in the set of keys 102 corresponding to another musical tone in another musical scale. For example, a user intending to use the electronic device 100 to generate and output audio corresponding to a song written based on musical tones in the C Major Pentatonic scale may operate a key in the set of keys 102 that is not associated with any musical tone in the C Major Pentatonic scale (e.g., white key corresponding to the musical tone B, which is not included in the C Major Pentatonic scale). In this case, the audio generated and output by the electronic device 100 when that key is operated may not be harmonious with audio generated and output the electronic device 100 in response to the operation of keys associated with musical tones in the intended musical scale. As a result, audio generated and output by the electronic device 100 when different keys in the set of keys 102 are operated may not be harmonious (e.g., the generated and output audio may not be harmonious with the tones forming the song).

To overcome these challenges and/or others, the electronic device 100 can be configured to generate harmonious audio. To facilitate harmonious audio generation, the electronic device 100 can be configured to operate in a default ("first") mode and a harmonious audio ("second") mode. In the first mode, the electronic device 100 can be configured to generate and output audio associated with a first set of tones. In some implementations, the tones included in the first set of tones can be associated with a plurality of musical scales. In some implementations, the tones included in the first set of tones correspond to the set of tones associated with each octave 104. For example, referring to FIG. 1, the tones of the first set of tones can include the 12 tones of each respective octave 104 (i.e., the seven white keys of the respective octave 104 corresponding to the tones C, D, E, F, G, A, B and the five black keys of the respective octave 104 corresponding to the tones C #/Db, D #/Eb, F #/Gb, G #/Ab, A #/Bb).

In the second mode, the electronic device 100 can be configured to generate and output audio associated with a second set of tones. In some implementations, the tones included in the second set of tones correspond to a subset of tones of the first set of tones. In some implementations, the tones included in the second set of tones correspond to a subset of tones of the set of tones associated with each octave 104. In some implementations, the tones included in the second set of tones can be associated with a selected musical scale from among the plurality of musical scales. For example, in a case the selected musical scale is the C Major Pentatonic scale, the second set of tones can include the 5 tones of the 12 tones of each respective octave 104 that are associated with the C Major Pentatonic scale (i.e., five white keys of the respective octave 104 corresponding to the tones C, D, E, G, A). In another example, in a case the selected musical scale is the D Major Pentatonic scale, the second set of tones can include the 5 tones of the 12 tones of each respective octave 104 that are associated with the D Major Pentatonic Scale (i.e., four white keys and one black key of the respective octave 104 corresponding to the tones D, E, F #, A, B). In a further example, in a case the selected musical scale is the E Major Pentatonic scale, the second set of tones can include the 5 tones of the 12 tones of each respective octave 104 that are associated with the E Major Pentatonic scale (i.e., three white keys and two black keys of the respective octave 104 corresponding to the tones C #, E, F #, G #, B). In this way, tones to be included in the second set of tones can be selected depending on a selected musical scale. While the foregoing has been described with respect to three pentatonic scales, the foregoing is not intended to be limiting and other scales can be selected.

The electronic device 100 can be configured to switch between operating in the first mode and operating in the second mode. In some implementations, the electronic device 100 can include a control panel 106 that includes a plurality of control members such as buttons, switches, knobs, and the like. In some implementations, the control panel 106 includes a control member for selecting the first mode, a control member for selecting the second mode, and a control member for selecting a musical scale among a plurality of musical scales. To select the first mode, a user of the electronic device 100 can operate (e.g., touch, depress, rotate) the control member for selecting first mode. To select the second mode, the user of the electronic device 100 can operate (e.g., touch, depress, or rotate) the control member for selecting the second mode. To select a musical scale, the user of the electronic device 100 can operate (e.g., touch, depress, or rotate) the control member for selecting a musical scale. In some implementations, a confirmation of the selected mode and/or musical scale can be provided by a display device 110 and/or the speakers 108 of the electronic device 100. In some implementations, the confirmation can be in the form of a textual message and/or a graphic that is displayed on the display device 110. In some implementations, the confirmation can be in the form of an audible message that is output using speakers 108. Selection of a mode and/or musical scale using control members of the control panel 106 is not intended to be limiting and the electronic device 100 can be configured to select a mode and/or musical scale using other forms of input such as voice input received at a microphone and/or touch input received at the display device 110.

The electronic device 100 can be configured to detect whether an input for changing a mode of the electronic device 100 from a first mode to a second mode and/or from a second mode to a first mode has been received and operate the electronic device 100 in the selected mode. For example, the electronic device 100 can detect whether a knob has been rotated to a first position and operate the electronic device 100 in the first mode and detect whether the knob has been rotated to a second position and operate the electronic device 100 in the second mode. In response to detecting that the electronic device 100 is to be operated in the first mode, the electronic device 100 can be configured to generate and output audio corresponding to the first set of tones. In response to detecting that the electronic device 100 is to be operated in the second mode, the electronic device 100 can be configured to further determine which musical scale is selected from among a plurality of musical scales, determine which tones should be included in the second set of tones, and generate and output audio corresponding to the second set of tones. For example, in response to detecting that the electronic device 100 is to be operated in the second mode, the electronic device 100 can detect which position among a plurality of positions a knob has been rotated to, determine which musical scale among the plurality of musical scales is associated with the selected knob position, determine which tones should be included in the second set of tones based on the selected musical scale, and generate and output audio corresponding to the second set of tones.

The electronic device 100 can be configured to store information identifying which tones of a respective octave 104 are included in the first set of tones, information identifying musical scales, and information associating tones with each musical scale of the musical scales. The electronic device 100 can be configured to store the information in one or more data structures in one or more storage devices (not shown). In some implementations, the electronic device 100 can be configured to store the information in one or more look-up tables and/or relational databases in the one or more storage devices. In some implementations, the electronic device 100 can be configured to store the information in a cloud-based environment and access the information using one or more networks. In some implementations, the electronic device 100 can be configured to receive input from a user and identify tones for the first and second modes based on the input received from the user. For example, using the display device 110, a user can select tones for the first and second modes. In some implementations, the electronic device 100 can be configured to identify tones for the first and second modes based on a geographic region the electronic device 100 is located (e.g., North America). For example, the electronic device 100 can acquire position information indicative of a geographic location where the electronic device 100 is located and identify tones for the first and second modes based on the geographic location associated with the position information. The foregoing is not intended to be limiting and other arrangements for identifying tones for the first and second modes are possible.

To facilitate operation in the second mode, the electronic device 100 can be configured to modify electrical connections between a matrix circuit of the electronic device 100 and the set of keys 102. In some implementations, each key in the set of keys 102 can be electrically connected to a matrix circuit included in the electronic device 100. In some implementations, the matrix circuit can be configured to generate a signal associated with the key and route that signal to one or more other components of the electronic device 100. In some implementations, the matrix circuit can be configured as a matrix of row wires/leads and column wires/leads. Each key in the set of keys 102 can be electrically connected to a wire/lead for one row of the matrix and/or a column wire/lead for one column of the matrix such that operating a respective key causes a row wire/lead in the matrix to be electrically connected to a column wire/lead of the matrix. Modifying the electrical connections between the matrix circuit and the set of keys 102 can cause tones associated with one or more keys of the set of keys 102 to be associated with one or more other keys in the set of keys 102. For example, a tone C associated with a first key in the set of keys 102 in the first mode can be associated with a second key in the set of keys 102 in the second mode such that audio corresponding to the tone C is generated and output by the electronic device 100 when the first key is operated in the first mode and when the second key is operated in the second mode.

In some implementations, to modify the electrical connections between the matrix circuit and the set of keys 102, a controller (not shown) of the electronic device 100 can be configured to modify an electrical connection between a key in the set of keys 102 and the row wire/lead and/or column wire/lead that key is connected to. For example, a key in the set of keys 102 that is electrically connected to a wire/lead in the fourth row of the matrix and/or a column wire/lead in the tenth row of the matrix can be modified such that the key is electrically connected to a row wire/lead in the third row of the matrix and/or a column wire/lead in the ninth column of the matrix. While the foregoing has been described with respect to a controller and a matrix circuit other circuitry can be used to modify the electrical connections such as an integrated circuit, a multiplexer, and the like.

Figure 2A:
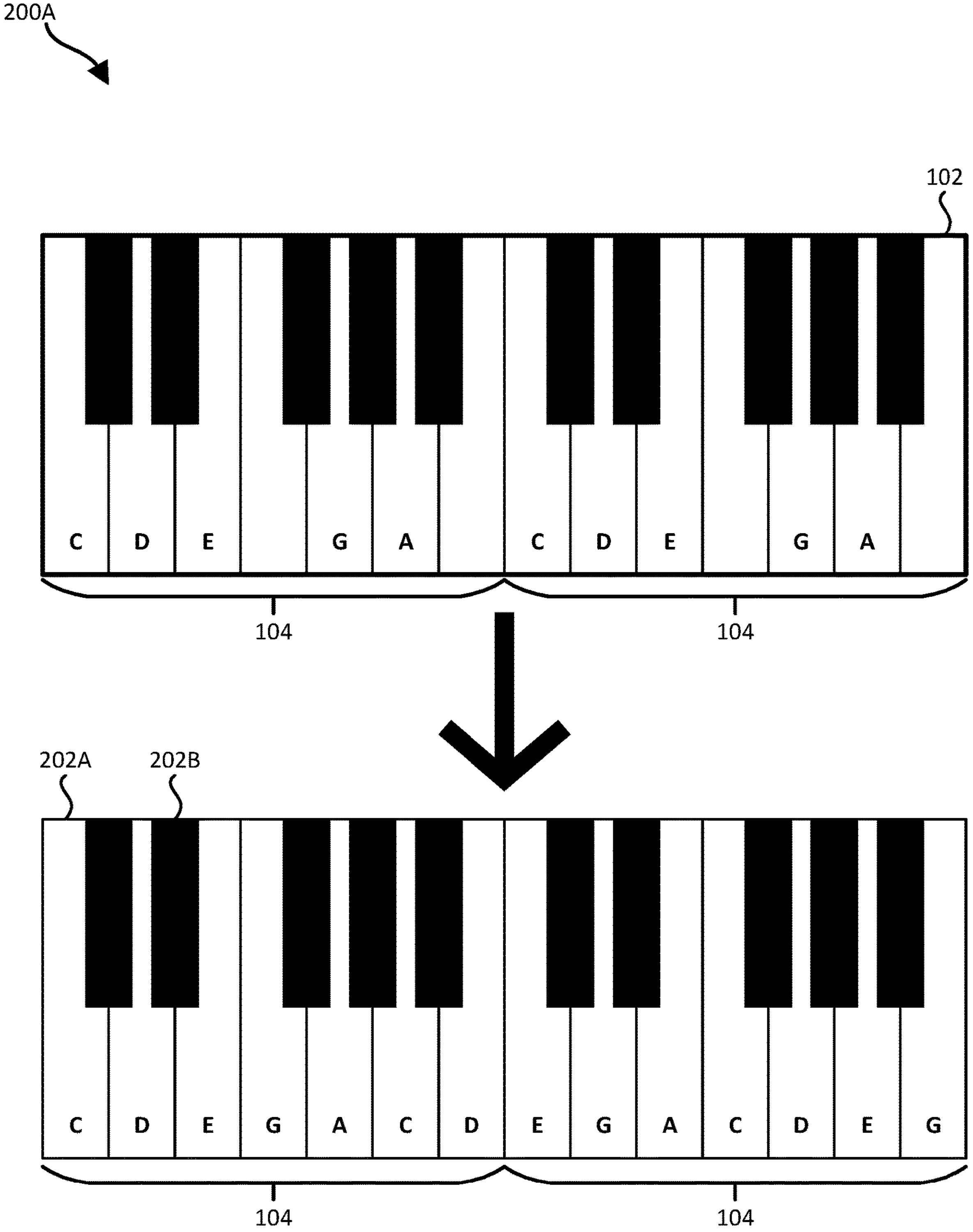
FIGS. 2A-2C illustrates example arrangements of sets of keys of an electronic device according to some implementations of the present disclosure.
Figure 2B:
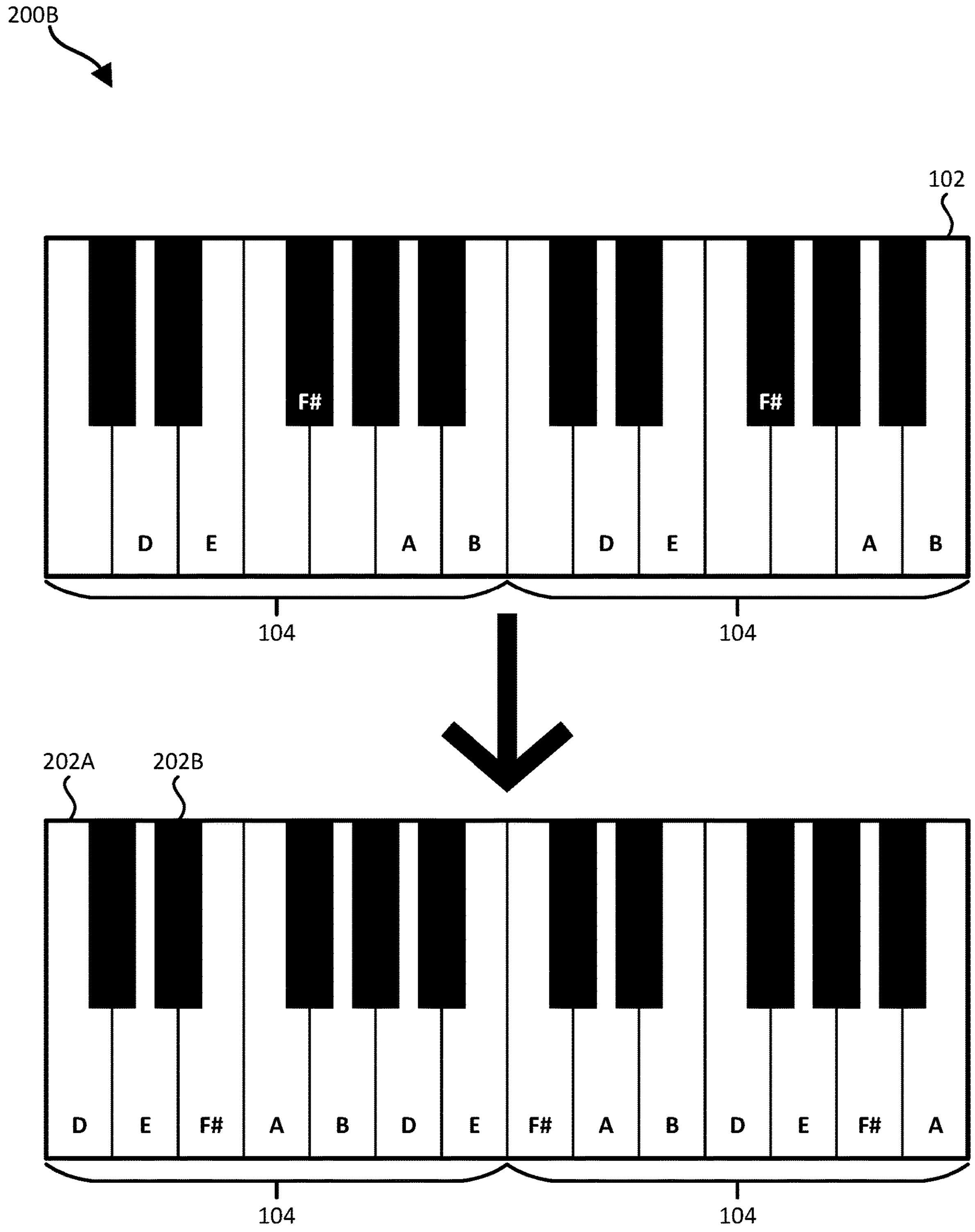
Figure 2C:
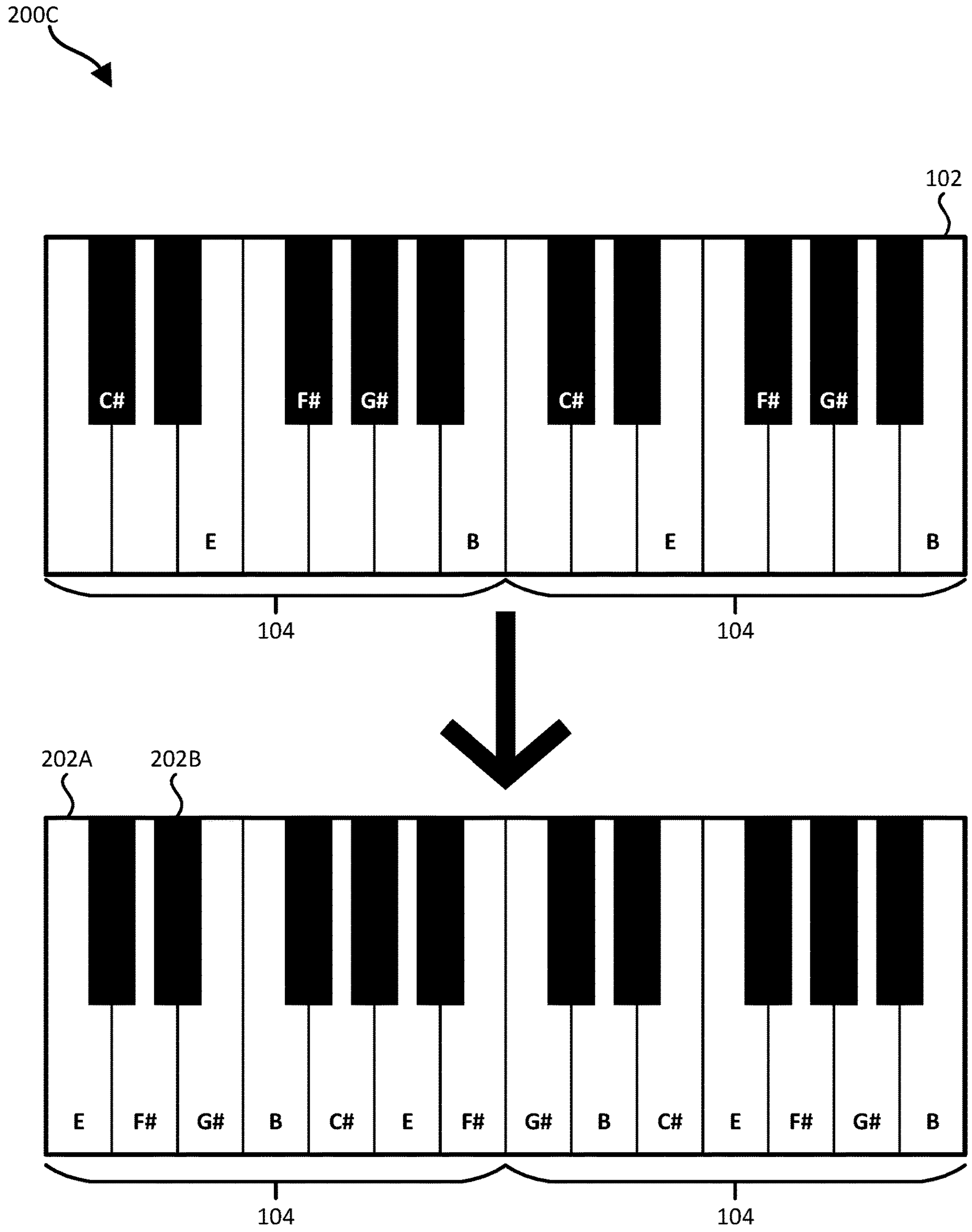

In some implementations, when the electronic device 100 is set to be operated in the second mode, the electrical connections between the matrix circuit and the set of keys 102 can be modified such that keys of the set of keys 102 that are associated with the second set of tones are operational. For example, referring to FIG. 2A, in a case the selected musical scale is the C Major Pentatonic scale 200A, keys of the set of keys 102 that are associated with the tones for that musical scale (i.e., five white keys of the respective octave 104 corresponding to the tones C, D, E, G, A) can be operational while the remaining keys of the set of keys 102 can be set to be non-operational or disabled. In another example, referring to FIG. 2B, in a case the selected musical scale is the D Major Pentatonic scale 200B, keys of the set of keys 102 that are associated with the tones of that musical scale (i.e., four white keys and one black key of the respective octave 104 corresponding to the tones D, E, F #, A, B) can be operational and while the remaining keys of the set of keys 102 can be set to be non-operational or disabled. In a further example, referring to FIG. 2C, in a case the selected musical scale is the E Major Pentatonic scale 200C, keys of the set of keys 102 that are associated with the tones of that musical scale (i.e., three white keys and two black keys of the respective octave 104 corresponding to the tones C #, E, F #, G #, B) can be operational and while the remaining keys of the set of keys 102 can be set to be non-operational or disabled. In this way, electrical connections for the set of keys 102 can be modified such that only keys in the set of keys 102 that are associated with harmonious tones are operational. As such, the electronic device 100 can generate and output harmonious audio.

In some implementations, the electrical connections can be modified such that tones of the selected musical scale are only associated with one group of color-coded keys of the set of keys 102 (e.g., the white keys and/or the black keys). For example, again referring to FIG. 2A, in the case the selected musical scale is the C Major Pentatonic scale 200A, the electrical connections between the matrix circuit and the set of keys 102 can be modified such that tones for that musical scale (i.e., tones C, D, E, G, A) can be associated with keys included in a group of color-coded keys 202A and the remaining keys 202B of the set of keys 102 can be set to be non-operational. In another example, again referring to FIG. 2B, in the case the selected musical scale is the D Major Pentatonic scale 200B, the electrical connections between the matrix circuit and the set of keys 102 can be modified such that tones for that musical scale (i.e., tones D, E, F #, A, B) can be associated with keys included in a group of color-coded keys 202A and the remaining keys 202B of the set of keys 102 can be set to be non-operational. In a further example, referring to FIG. 2C, in the case the selected musical scale is the E Major Pentatonic scale 200C, the electrical connections between the matrix circuit and the set of keys 102 can be modified such that tones for that musical scale (i.e., tones C #, E, F #, G #, B) can be associated with keys included in a group of color-coded keys 202A and the remaining keys 202B of the set of keys 102 can be set to be non-operational. In this way, electrical connections for the set of keys 102 can be modified such that only keys in the set of keys 102 that are associated with harmonious tones are operational and available to the user in a convenient way. As such, the electronic device 100 can generate and output harmonious audio.

Figure 3:
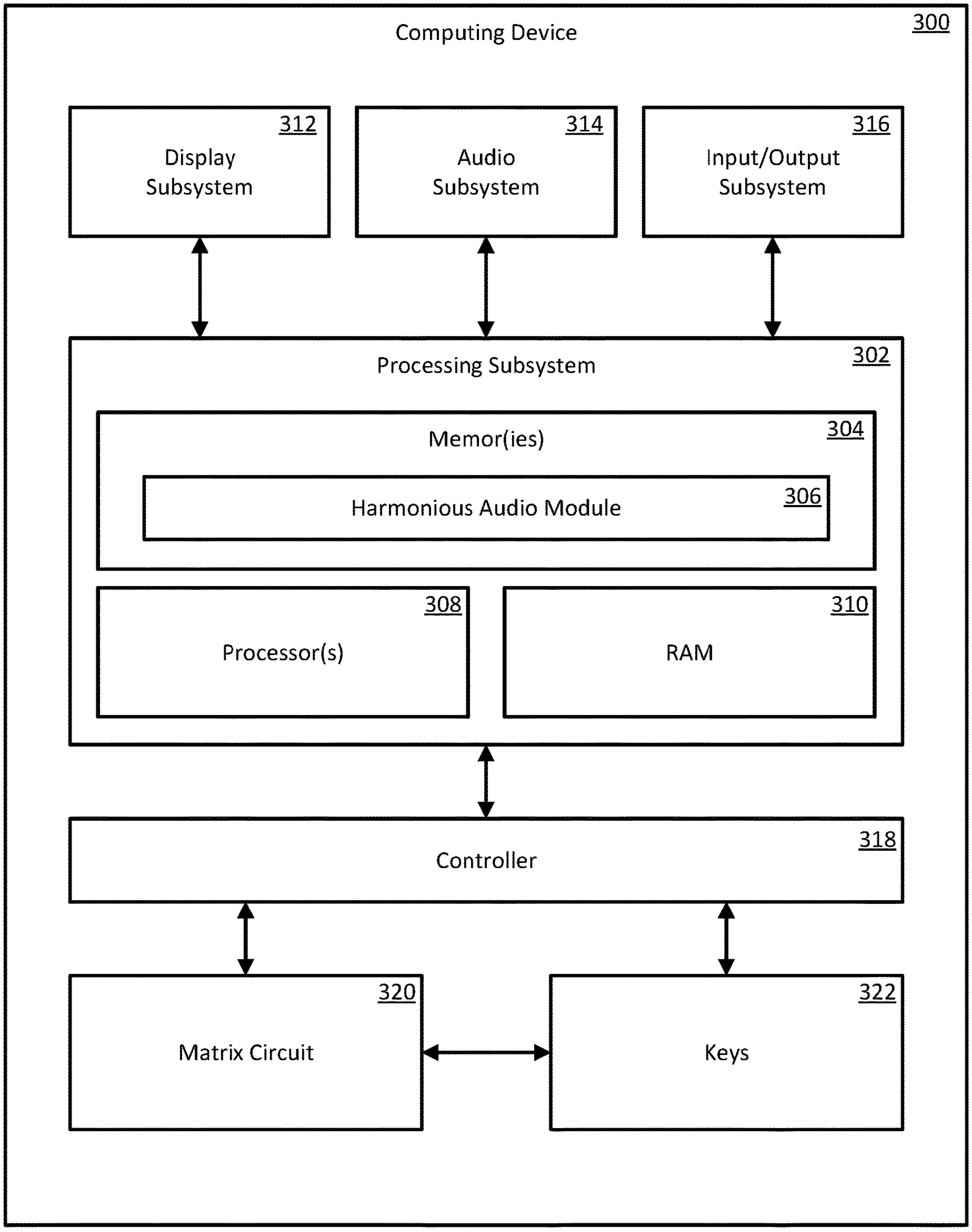
FIG. 3 illustrates a block diagram of an example of a computing device according to some implementations of the present disclosure.

FIG. 3 illustrates a block diagram of an example of a computing device 300. The computing device 300 can serve as the electronic device 100 shown in FIG. 1. The computing device 300 can be implemented in various configurations in order to provide various functionality to a user. For example, the computing device 300 can be implemented as an electronic instrument such as an electronic piano or keyboard, a personal computer, a smartphone, a video game console, an audio synthesizer, a MIDI controller, a drum machine, an electric drum kit, a music workstation, an audio sampling workstation, an audio effects unit, an audio amplifier, an audio mixing console, and the like. These examples are not meant to be limiting and other examples are also possible.

As shown in FIG. 3, the computing device 300 includes a processing subsystem 302, a controller 318, a matrix circuit 320, keys 322, a display subsystem 312, an audio subsystem 314, and an input/output subsystem 316. The keys 322 can include a linear arrangement of a group of color-coded keys (e.g., white keys) that are interposed with a linear arrangement of another group of color-coded keys (e.g., black keys). The keys 322 can include any number of keys (e.g., 32, 36, 37, 49, 54, 61, 76, 88, etc.). The number of keys within each group of color-coded keys can be based on the total number of keys 322. The keys 322 can be configured to be operated by a user.

In some implementations, the keys 322 can be operated by touching and/or depressing. The keys 322, when operated, cause the computing device 300 to generate and output audio. In some implementations, each key can be electrically connected to the matrix circuit 320. In some implementations, when a key is operated, the matrix circuit 320 can be configured to generate a signal associated with the key and route that signal to the processing subsystem 302 such that audio associated with the key can be generated and output. In some implementations, the audio can be output using speakers included in the audio subsystem 314. In some implementations, each key can, when operated, cause the computing device 300 to generate and output audio having a different tone or pitch from audio generated and output by the computing device 300 when another key is operated. By continuously and, in some cases, concurrently, operating different keys, audio can be continuously generated and output by the computing device 300.

In some implementations, the audio generated and output by the computing device 300 can be in the form of music and/or musical. In some implementations, the keys 322 can be associated with octaves such that, for each octave, keys in one group of color-coded keys (e.g., the white keys) and keys of the other group of color-coded keys (e.g., the black keys) can correspond to different musical tones of the respective octave. Each octave can include the same set of tones and each tone of a respective octave can be associated with a different key of the keys 322. Musical tones that form each octave can form one or more musical scales for the respective octave. Musical tones that form each octave can form one or more musical scales for the respective octave. In some implementations, musical tones in a musical scale are harmonic such that audio corresponding to a musical tone included in musical tones in a musical scale that is generated and output by the computing device 300 is harmonious with audio corresponding to any other musical tone in the musical scale that is generated and output by the computing device 300.

The processing subsystem 302 includes one or more memories 304, one or more processors 308, and RAM 310. The one or more processors 308 can read one or more programs from the one or more memories 304 and execute them using RAM 310. Each of the one or more processors 308 can be of any type including but not limited to a microprocessor, a microcontroller, a graphical processing unit, a digital signal processor, an application-specific integrated circuit (ASIC), a field programmable gate array (FPGA), or any combination thereof. In some embodiments, the one or more processors 308 can include a plurality of cores, a plurality of arrays, one or more coprocessors, and/or one or more layers of local cache memory. The one or more processors 308 can execute one or more programs stored in the one or more memories 304 to perform the operations and/or methods, including parts thereof, described herein.

Each of the one or more memories 304 can be non-volatile and can include any type of memory device that retains stored information when powered off. Non-limiting examples of memory include electrically erasable and programmable read-only memory (EEPROM), flash memory, or any other type of non-volatile memory. At least one memory of the one or more memories 304 can include a non-transitory computer-readable storage medium from which the one or more processors 308 can read instructions. A computer-readable storage medium can include electronic, optical, magnetic, or other storage devices capable of providing the one or more processors 308 with computer-readable instructions or other program code. Non-limiting examples of a computer-readable storage medium include magnetic disks, memory chips, read-only memory (ROM), RAM, an ASIC, a configured processor, optical storage, or any other medium from which a computer processor can read the instructions. The one or more memories 304 can include a harmonious audio module 306. Although this module is presented as being included in the one or more memories 304, it can be implemented as an individual hardware and/or software component or may be implemented in the form of software that can be executed by the one or more processors 308.

The harmonious audio module 306 can be configured to cause the computing device 300 to generate and output harmonious audio in accordance with the operations and/or methods, including parts thereof, described herein. To facilitate harmonious audio generation, the harmonious audio module 306 can be configured to cause the computing device 300 to operate in a first mode and a second mode. In the first mode, the computing device 300 can generate and output audio associated with a first set of tones. The tones included in the first set of tones can be associated with a plurality of musical scales and can correspond to the set of tones associated with each octave.

In the second mode, the computing device 300 can generate and output audio associated with a second set of tones. The tones included in the second set of tones can correspond to a subset of tones of the first set of tones and/or a subset of tones of the set of tones associated with each octave. The tones included in the second set of tones can be associated with a selected musical scale from among the plurality of musical scales. For example, in a case the selected musical scale is the C Major Pentatonic scale, the second set of tones can include tones that are associated with the C Major Pentatonic scale (i.e., tones C, D, E, G, A). In this way, tones to be included in the second set of tones can be selected depending on a selected musical scale. While the foregoing has been described with respect to three pentatonic scales, the foregoing is not intended to be limiting and other scales can be selected.

The computing device 300 can be switch between operating in the first mode and operating in the second mode. In some implementations, the input/output subsystem 316 can include a plurality of control members such as buttons, switches, knobs, and the like. In some implementations, the input/output subsystem 316 can include a control member for selecting the first mode, a control member for selecting the second mode, and a control member for selecting a musical scale among a plurality of musical scales. To select the first mode, a user can operate (e.g., touch, depress, rotate) the control member for selecting first mode. To select the second mode, the user can operate (e.g., touch, depress, or rotate) the control member for selecting the second mode. To select a musical scale, the user can operate (e.g., touch, depress, or rotate) the control member for selecting musical scale. In some implementations, a confirmation of the selected mode and/or musical scale can be provided by a display device included in the display subsystem 312 and/or the speakers. In some implementations, the confirmation can be in the form of a textual message and/or a graphic that is displayed on the display device. In some implementations, the confirmation can be in the form of an audible message that is output using the speakers. Selection of a mode and/or musical scale using control members is not intended to be limiting and the mode and/or musical scale can be selected using other forms of input such as voice input received at a microphone and/or touch input received at the display device.

The computing device 300 can detect whether an input for changing the mode from the first mode to the second mode and/or from the second mode to the first mode has been received and can operate in the selected mode. In response to detecting that the first mode is selected, the computing device 300 can generate and output audio corresponding to the first set of tones. In response to detecting that the second mode is selected, the computing device 300 can further determine which musical scale is selected from among a plurality of musical scales, determine which tones should be included in the second set of tones, and generate and output audio corresponding to the second set of tones.

The computing device 300 can store information identifying which tones of a respective octave are included in the first set of tones, information identifying musical scales, and information associating tones with each musical scale of the musical scales. The information can be stored in one or more data structures in one or more storage devices included in the processing subsystem 302. In some implementations, the information can be stored in one or more look-up tables and/or relational databases in the one or more storage devices. In some implementations, the information can be stored in a cloud-based environment and access the information using one or more networks and communication interfaces included in the input/output subsystem 316. In some implementations, the computing device 300 can receive input from a user and identify tones for the first and second modes based on the input received from the user. In some implementations, the computing device 300 can be configured to identify tones for the first and second modes based on a geographic region the computing device 300 is located (e.g., North America).

To facilitate operation in the second mode, the harmonious audio module 306 can cause the controller 318 to modify electrical connections between the matrix circuit 320 and the keys 322. Each key can be electrically connected to the matrix circuit 320 and the matrix circuit 320 can generate a signal associated with the key and route that signal to the processing subsystem 302. The matrix circuit 320 can include a matrix of row wires/leads and column wires/leads and each key can be electrically connected to a wire/lead for one row of the matrix and/or a column wire/lead for one column of the matrix such that operating a respective key causes a row wire/lead in the matrix to be electrically connected to a column wire/lead of the matrix. Modifying the electrical connections between the matrix circuit 320 and the keys 322 can cause tones associated with one or more keys to be associated with one or more other keys. To modify the electrical connections between the matrix circuit 320 and the keys 322, the controller 318 can modify an electrical connection between a key and the row wire/lead and/or column wire/lead that key is connected to. For example, a key that is electrically connected to a wire/lead in the fourth row of the matrix and/or a column wire/lead in the tenth row of the matrix can be modified such that the key is electrically connected to a row wire/lead in the third row of the matrix and/or a column wire/lead in the ninth column of the matrix.

In some implementations, when the computing device 300 operates in the second mode, the electrical connections between the matrix circuit 320 and the keys 322 are modified such that keys that are associated with the second set of tones are operational. For example, in a case the selected musical scale is the C Major Pentatonic scale, keys that are associated with the tones for that musical scale (i.e., tones C, D, E, G, A) can be operational while the remaining keys can be set to be non-operational or disabled. In some implementations, the electrical connections can be modified such that tones of the selected musical scale are only associated with one group of color-coded keys (e.g., white keys and/or black keys). For example, in the case the selected musical scale is the C Major Pentatonic scale, the electrical connections between the matrix circuit and the keys 322 can be modified such that tones for that musical scale (i.e., tones C, D, E, G, A) can be associated with keys included in a group of color-coded keys and the remaining keys can be set to be non-operational. In this way, electrical connections for the keys 322 can be modified such that only keys that are associated with harmonious tones are operational. As such, the computing device 300 can generate and output harmonious audio.

The display subsystem 312 can be configured to display textual and/or graphical content on a display device and receive input from a user of the computing device 300. Examples of the display device include a liquid crystal display, a light emitting diode display, an organic light emitting diode display, a projector display, a touchscreen display, and the like. The audio subsystem 314 can be configured to record sounds from the environment surrounding the computing device 300 and output audio and other sounds to the environment surrounding the computing device 300. Examples of audio devices included in audio subsystem 314 include microphones, speakers, and other audio/sound transducers for receiving and outputting audio signals and other sounds. The input/output subsystem 316 can be configured provide the computing device 300 with various input/output functionality. Examples of input/output members included in the input/output subsystem 316 include control members, control panels, storage devices, power generating/storing devices, input/output (I/O) components, and the like.

Figure 4:
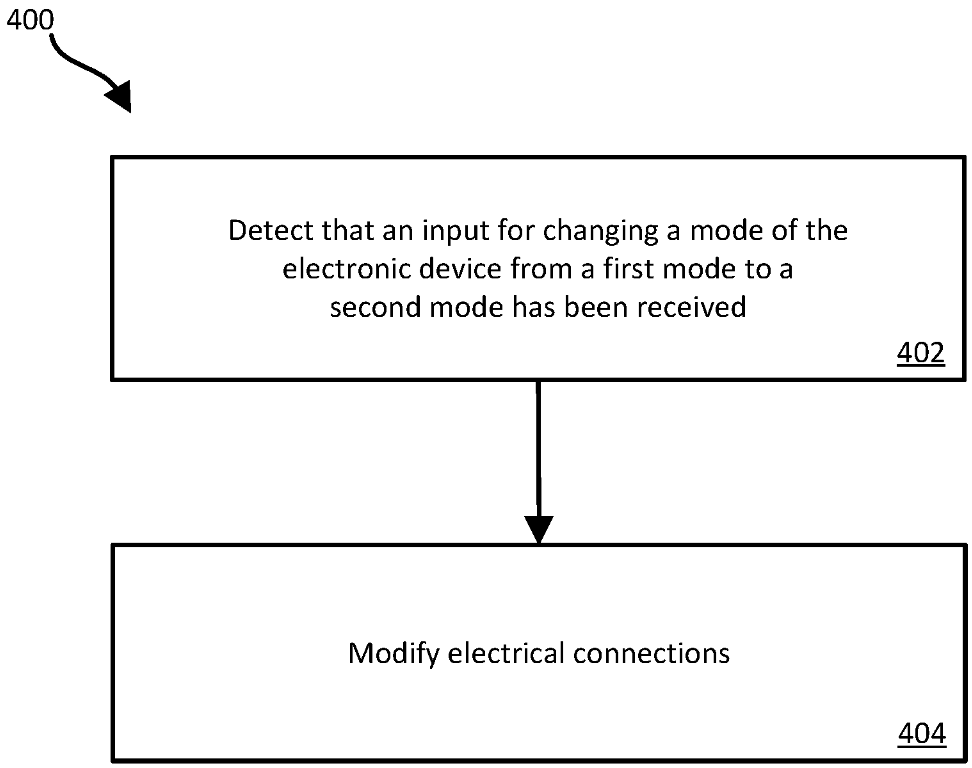
FIG. 4 illustrates an embodiment of a method for controlling an electronic device according to some implementations of the present disclosure.

FIG. 4 illustrates an embodiment of a method 400 for controlling an electronic device such as electronic device 100 shown in FIG. 1. The method 400 may be implemented in software (e.g., code, instructions, program) that is executed by a processing system such as processing subsystem 302 of the computing device 300. The software may be stored on a non-transitory computer-readable storage medium (e.g., a memory device). The method 400 is intended to be illustrative and non-limiting. For example, although FIG. 4 depicts the various processing steps occurring in a particular sequence or order, in other embodiments, the steps may be performed in some different order, or some steps may also be performed in parallel.

At block 402, a detection is made that an input for changing a mode of an electronic device such as electronic device 100 from a first mode to a second mode has been received. For example, a detection can be made whether an input for changing a mode of the electronic device from a first mode to a second mode and/or from a second mode to a first mode has been received and the electronic device can operate in the selected mode. The electronic device can include a control panel that includes a plurality of control members such as buttons, switches, knobs, and the like. The control panel can include a control member for selecting the first mode, a control member for selecting the second mode, and a control member for selecting a musical scale among a plurality of musical scales. To select the first mode, a user of the electronic device can operate (e.g., touch, depress, rotate) the control member for selecting first mode. To select the second mode, the user of the electronic device can operate (e.g., touch, depress, or rotate) the control member for selecting the second mode. For example, the electronic device can detect whether a knob has been rotated to a first position and operate the electronic device in the first mode and detect whether the knob has been rotated to a second position and operate the electronic device in the second mode. To select a musical scale, the user of the electronic device can operate (e.g., touch, depress, or rotate) the control member for selecting musical scale. In some implementations, a confirmation of the selected mode and/or musical scale can be provided by a display device and/or speakers of the electronic device. In some implementations, the confirmation can be in the form of a textual message and/or a graphic that is displayed on the display device. In some implementations, the confirmation can be in the form of an audible message that is output using speakers.

In response to detecting that the electronic device is to be operated in the first mode, the electronic device can generate and output audio corresponding to a first set of tones. The tones included in the first set of tones can be associated with a plurality of musical scales. In some implementations, the tones included in the first set of tones correspond to a set of tones associated with each octave of a set of keys such as the set of keys 102 included in the electronic device 100.

The set of keys can include a linear arrangement of a group of color-coded keys (e.g., white keys) that are interposed with a linear arrangement of another group of color-coded keys (e.g., black keys). The set of keys can include any number of keys (e.g., 32, 36, 37, 49, 54, 61, 76, 88, etc.). The number of keys within each group of color-coded keys can be based on the total number of keys included in the set of keys. The keys in the set of keys can be operated by a user. In some implementations, the keys can be operated by touching and/or depressing. The keys, when operated, cause the electronic device to generate and output audio. In some implementations, each key in the set of keys can be electrically connected to a matrix circuit included in the electronic device and, when a key in the set of keys is operated, the matrix circuit can be configured to generate a signal associated with the key and route that signal to one or more other components of the electronic device for generating audio associated with the key. For example, when a key in the set of keys is operated, the matrix circuit can be configured to generate a signal associated with that key and route that signal to a processor where it can be processed into audio corresponding to the key and that can be output. In some implementations, the audio can be output using speakers. In some implementations, each key in the set of keys can, when operated, cause the electronic device to generate and output audio having a different tone or pitch from audio generated and output by the electronic device when another key in the set of keys is operated. By continuously and, in some cases, concurrently, operating different keys of the set of keys, audio can be continuously generated and output by the electronic device.

In some implementations, the audio generated and output by the electronic device can be in the form of music and/or musical. The keys in the set of keys can be associated with octaves such that, for each octave, keys in one group of color-coded keys (e.g., the white keys) and keys of the other group of color-coded keys (e.g., the black keys) can correspond to different musical tones of the respective octave. Each octave can include the same set of tones and each tone of a respective octave can be associated with a different key of the set of keys. Musical tones that form each octave can form one or more musical scales for the respective octave. For example, for an octave, a group of five tones (e.g., C, D, E, G, A) can form a musical scale (e.g., a C Major Pentatonic musical scale).

In some implementations, musical tones in a musical scale are harmonic such that audio corresponding to a musical tone included in musical tones in a musical scale that is generated and output by the electronic device is harmonious with audio corresponding to any other musical tone in the musical scale that is generated and output by the electronic device. For example, for the C Major Pentatonic scale for a respective octave, the tones C, D, E, G, A of that scale are harmonic, and the audio generated and output by the electronic device corresponding to those tones is harmonious.

In response to detecting that the electronic device is to be operated in the second mode, further determinations can be made as to which musical scale is selected from among a plurality of musical scales and which tones should be included in a second set of tones and audio can be generated and output by the electronic device corresponding to the second set of tones. For example, in response to detecting that the electronic device is to be operated in the second mode, the electronic device can detect which position among a plurality of positions a knob has been rotated to, determine which musical scale among the plurality of musical scales is associated with the selected knob position, determine which tones should be included in the second set of tones based on the selected musical scale, and generate and output audio corresponding to the second set of tones.

Information identifying which tones of a respective octave are included in the first set of tones, information identifying musical scales, and information associating tones with each musical scale of the musical scales can be stored. The information can be stored in one or more data structures in one or more storage devices, in one or more look-up tables and/or relational databases in the one or more storage devices, and/or in a cloud-based environment where it can be accessed using one or more networks. In some implementations, input can be received from a user and tones for the first and second modes can be identified based on the input received from the user. In some implementations, tones for the first and second modes can be identified based on a geographic region the electronic device is located (e.g., North America) in.

In block 404, electrical connections between the matrix circuit and the set of keys of the electronic device are modified. In some implementations, the electrical connections can be modified using a controller of the electronic device. In some implementations, the controller of the electronic device can modify electrical connections between the matrix circuit and the set of keys in response to detecting that the electronic device is to be operated in the second mode. In some implementations, each key in the set of keys can be electrically connected to the matrix circuit. In some implementations, the matrix circuit can be configured to generate a signal associated with the key and route that signal to one or more other components of the electronic device. In some implementations, the matrix circuit can be configured as a matrix of row wires/leads and column wires/leads. Each key in the set of keys can be electrically connected to a wire/lead for one row of the matrix and/or a column wire/lead for one column of the matrix such that operating a respective key causes a row wire/lead in the matrix to be electrically connected to a column wire/lead of the matrix. Modifying the electrical connections between the matrix circuit and the set of keys can cause tones associated with one or more keys of the set of keys to be associated with one or more other keys in the set of keys. For example, a tone C associated with a first key in the set of keys in the first mode can be associated with a second key in the set of keys in the second mode such that audio corresponding to the tone C is generated and output by the electronic device when the first key is operated in the first mode and when the second key is operated in the second mode.

In some implementations, to modify the electrical connections between the matrix circuit and the set of keys, the controller can modify an electrical connection between a key in the set of keys and the row wire/lead and/or column wire/lead that key is connected to. For example, a key in the set of keys that is electrically connected to a wire/lead in the fourth row of the matrix and/or a column wire/lead in the tenth row of the matrix can be modified such that the key is electrically connected to a row wire/lead in the third row of the matrix and/or a column wire/lead in the ninth column of the matrix.

In some implementations, when the electronic device is set to be operated in the second mode, the electrical connections between the matrix circuit and the set of keys can be modified such that keys of the set of keys that are associated with the second set of tones are operational. In some implementations, the electrical connections can be modified such that tones of the selected musical scale are only associated with one group of color-coded keys of the set of keys (e.g., the white keys and/or the black keys). In this way, electrical connections for the set of keys can be modified such that only keys in the set of keys that are associated with harmonious tones are operational and available to the user in a convenient way. As such, the electronic device can generate and output harmonious audio.

The systems and methods of the present disclosure may be implemented using hardware, software, firmware, or a combination thereof and may be implemented in one or more computer systems or other processing systems. Some embodiments of the present disclosure include a system including a processing system that includes one or more processors. In some embodiments, the system includes a non-transitory computer readable storage medium containing instruction which, when executed on the one or more processors, cause the system and/or the one or more processors to perform part or all of one or more methods and/or part or all of one or more processes disclosed herein. Some embodiments of the present disclosure include a computer-program product tangibly embodied in a non-transitory machine-readable storage medium, including instructions configured to cause the system and/or the one or more processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method for controlling an electronic device comprising a set of keys, the method comprising:

detecting that an input for changing a mode of the electronic device from a first mode to a second mode has been received; and in response to detecting that the input for changing the mode of the electronic device from the first mode to the second mode has been received, causing a controller to modify electrical connections between a matrix circuit and a set of keys of the electronic device, the set of keys being linearly arranged along a plane and including a first subset of keys and a second subset of keys, wherein the first subset of keys comprises groups of two keys of the first subset of keys that are linearly arranged along the plane between groups of three keys of the first subset of keys, wherein each key in the first subset of keys is positioned between two keys in the second subset of keys, wherein the second subset of keys comprises groups of three keys of the second subset of keys that are linearly arranged along the plane between groups of four keys of the second subset of keys, wherein keys in the groups of three keys of the second subset of keys are adjacent to keys in the groups of two keys of the first subset of keys, wherein each key in the second subset of keys is positioned adjacent to at least one other key in the second subset of keys and associated with a tone in a set of tones corresponding to a musical scale, wherein modifying the electrical connections between the matrix circuit and the set of keys causes tones in the set of tones to be associated with a group of adjacent keys of the second subset of keys, the group of adjacent keys of the second subset of keys comprising keys included different groups of keys of the second subset of keys.

2. The method of claim 1, wherein causing the controller to modify the electrical connections between the matrix circuit and the set of keys comprises modifying an electrical connection between the matrix circuit and the first subset of keys and modifying an electrical connection between the matrix circuit and the second subset of keys.

3. The method of claim 1, wherein at least one key in a group of two keys of the first subset of keys is adjacent to at least one key in a group of three keys of the second subset of keys.

4. The method of claim 1, wherein a sound output by the electronic device when a key of the second subset of keys is pressed while the electronic device is in the first mode is different from a sound output by the electronic device when the key is pressed while the electronic device is in the second mode.

5. The method of claim 1, wherein at least one key in a group of three keys of the first subset of keys is adjacent to at least one key in a group of four keys of the second subset of keys.

6. The method of claim 1, wherein modifying the electrical connections between the matrix circuit and the set of keys causes at least one tone associated with a key in the first subset of keys to be associated with a key in the second subset of keys.

7. The method of claim 1, wherein at least one key in the first subset of keys is associated with a tone in a musical scale that is different than the musical scale.

8. An electronic device comprising:

a set of keys;

one or more processors; and a computer-readable medium storing instructions which, when executed by the one or more processors, cause the electronic device to perform operations comprising:

detecting that an input for changing a mode of the electronic device from a first mode to a second mode has been received; and in response to detecting that the input for changing the mode of the electronic device from the first mode to the second mode has been received, causing a controller to modify electrical connections between a matrix circuit and a set of keys of the electronic device, the set of keys being linearly arranged along a plane and including a first subset of keys and a second subset of keys, wherein the first subset of keys comprises groups of two keys of the first subset of keys that are linearly arranged along the plane between groups of three keys of the first subset of keys, wherein each key in the first subset of keys is positioned between two keys in the second subset of keys, wherein the second subset of keys comprises groups of three keys of the second subset of keys that are linearly arranged along the plane between groups of four keys of the second subset of keys, wherein keys in the groups of three keys of the second subset of keys are adjacent to keys in the groups of two keys of the first subset of keys, wherein each key in the second subset of keys is positioned adjacent to at least one other key in the second subset of keys and associated with a tone in a set of tones corresponding to a musical scale, wherein modifying the electrical connections between the matrix circuit and the set of keys causes tones in the set of tones to be associated with a group of adjacent keys of the second subset of keys, the group of adjacent keys of the second subset of keys comprising keys included different groups of keys of the second subset of keys.

9. The electronic device of claim 8, wherein causing the controller to modify the electrical connections between the matrix circuit and the set of keys comprises modifying an electrical connection between the matrix circuit and the first subset of keys and modifying an electrical connection between the matrix circuit and the second subset of keys.

10. The electronic device of claim 8, wherein at least one key in a group of two keys of the first subset of keys is adjacent to at least one key in a group of three keys of the second subset of keys.

11. The electronic device of claim 8, wherein a sound output by the electronic device when a key of the second subset of keys is pressed while the electronic device is in the first mode is different from a sound output by the electronic device when the key is pressed while the electronic device is in the second mode.

12. The electronic device of claim 8, wherein at least one key in a group of three keys of the first subset of keys is adjacent to at least one key in a group of four keys of the second subset of keys.

13. The electronic device of claim 8, wherein modifying the electrical connections between the matrix circuit and the set of keys causes at least one tone associated with a key in the first subset of keys to be associated with a key in the second subset of keys.

14. The electronic device of claim 8, wherein a at least one key in the first subset of keys is associated with a tone in a musical scale that is different than the musical scale.

15. A non-transitory computer-readable medium storing instructions which, when executed by one or more processors, cause an electronic device to perform operations comprising:

detecting that an input for changing a mode of the electronic device from a first mode to a second mode has been received; and in response to detecting that the input for changing the mode of the electronic device from the first mode to the second mode has been received, causing a controller to modify electrical connections between a matrix circuit and a set of keys of the electronic device, the set of keys being linearly arranged along a plane and including a first subset of keys and a second subset of keys, wherein the first subset of keys comprises groups of two keys of the first subset of keys that are linearly arranged along the plane between groups of three keys of the first subset of keys, wherein each key in the first subset of keys is positioned between two keys in the second subset of keys, wherein the second subset of keys comprises groups of three keys of the second subset of keys that are linearly arranged along the plane between groups of four keys of the second subset of keys, wherein keys in the groups of three keys of the second subset of keys are adjacent to keys in the groups of two keys of the first subset of keys, wherein each key in the second subset of keys is positioned adjacent to at least one other key in the second subset of keys and associated with a tone in a set of tones corresponding to a musical scale, wherein modifying the electrical connections between the matrix circuit and the set of keys causes tones in the set of tones to be associated with a group of adjacent keys of the second subset of keys, the group of adjacent keys of the second subset of keys comprising keys included different groups of keys of the second subset of keys.

16. The non-transitory computer-readable medium of claim 15, wherein causing the controller to modify the electrical connections between the matrix circuit and the set of keys comprises modifying an electrical connection between the matrix circuit and the first subset of keys and modifying an electrical connection between the matrix circuit and the second subset of keys.

17. The non-transitory computer-readable medium of claim 15, wherein at least one key in a group of two keys of the first subset of keys is adjacent to at least one key in a group of three keys of the second subset of keys.

18. The non-transitory computer-readable medium of claim 15, wherein a sound output by the electronic device when a key of the second subset of keys is pressed while the electronic device is in the first mode is different from a sound output by the electronic device when the key is pressed while the electronic device is in the second mode.

19. The non-transitory computer-readable medium of claim 15, wherein at least one key in a group of three keys of the first subset of keys is adjacent to at least one key in a group of four keys of the second subset of keys.

20. The non-transitory computer-readable medium of claim 15, wherein at least one key in the first subset of keys is associated with a tone in a musical scale that is different than the musical scale.

* * * * *